US006634887B1

(12) United States Patent
Heffernan, III et al.

(10) Patent No.: US 6,634,887 B1
(45) Date of Patent: Oct. 21, 2003

(54) METHODS AND SYSTEMS FOR TUTORING USING A TUTORIAL MODEL WITH INTERACTIVE DIALOG

(75) Inventors: Neil Thomas Heffernan, III, Pittsburgh, PA (US); Kenneth R. Koedinger, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 139 days.

(21) Appl. No.: 09/884,743

(22) Filed: Jun. 19, 2001

(51) Int. Cl.[7] .................................................. G09B 7/00
(52) U.S. Cl. ........................ 434/322; 704/270; 704/255
(58) Field of Search ................................ 434/322, 323, 434/350; 704/255, 251, 266, 256, 270

(56) References Cited

U.S. PATENT DOCUMENTS 5,920,838 A * 7/1999 Mostow et al. ............. 704/255
2002/0156632 A1 * 10/2002 Haynes et al. .............. 704/270

OTHER PUBLICATIONS

Presentation by Ken Koedinger: Social Science Data Infrastructure Conference. New York University. "Learning Factors Analysis: Mining Student–Tutor Interactions to Optimize Instruction"; Nov. 12–13, 1999.
Presentation by Ken Koedinger: Center for Interdisciplinary Research on Constructive Learning Environments (CIRCLE) Seminar. LRDC, University of Pittsburgh. "Supporting Meta–Cognitive Knowledge Construction: Steps Toward Third Generation Intelligent Tutors for Mathematics"; Sep. 24, 1999.
Neil T. Heffernan III, "Intelligent Tutoring Systems have Forgotten the Tutor: Adding a Cognitive Model of Human Tutors". School of Computer Science, Carnegie Mellon University, Pittsburgh, Pennsylvania, Mar. 2001.
Declaration of Kenneth R. Koedinger, Ph.D. executed May 9, 2003, 32 pp. (including exhibits).
Declaration of Neil T. Heffernan, Ph.D., executed May 8, 2003, 32 pp. (including exhibits).

* cited by examiner

*Primary Examiner*—Hieu T. Vo
(74) *Attorney, Agent, or Firm*—Kirkpatrick & Lockhart LLP

(57) ABSTRACT

Methods and systems are provided for tutoring a student in solving a problem described in the form of a dialog with a student involving questions posed to the student and analysis of student responses. The method employs a student model for receiving and diagnosing student input and a tutorial model for deciding what new questions to plan to ask the student. The method comprises the following steps: receiving the diagnosis in a tutorial processing module; generating an agenda including at least one question; applying at least one tutorial strategy to the diagnosis; and, providing feedback to the student based on application of the tutorial strategy given the current context as indicated by the agenda data structure. In certain aspects of the method, at least one knowledge remediation dialog and/or at least one knowledge construction dialog can be applied to generate dialog between the tutor and the student. System embodiments are also provided that incorporate the functions of the methods for tutoring a student. In addition, in other embodiments, the present tutoring methods and systems are practiced in connection with instructions stored on a computer-readable medium.

89 Claims, 3 Drawing Sheets

METHODS AND SYSTEMS FOR TUTORING USING A TUTORIAL MODEL WITH INTERACTIVE DIALOG

BACKGROUND OF THE INVENTION

1. Field of the Invention

The present invention generally relates to methods and systems for instructing or tutoring a student. The present invention more particularly relates to methods and systems for student instruction that employ an intelligent tutoring system for initiating a dialog between the tutoring system and the student.

2. Description of the Related Art

Some existing computer-based systems employ a model-tracing approach to adapt instruction to an individual student. Systems that apply model-tracing provide just instructional messages either in response to an incorrect step or when a student is stuck and requests a hint. While error messages adapt to different kinds of errors, the hint messages a student may request in a particular context do not adapt to prior student errors.

Traditional model-tracing tutors provide "buggy feedback" in the form of messages based on a diagnosed error and provide one or more hints that direct a student to a correct action or response. With regard to buggy feedback, each production rule in the student model portion of the tutoring system that represents a common error is marked as a buggy rule. These production rules also contain templates to generate a feedback message. One such buggy rule, for example, might have a template that tells the student to put parentheses around a portion of an incorrect student response for which parentheses are required. Hints are usually only given when requested by the student. When a student asks for a hint on a given question, the tutor executes a production system to compute a next step and fill a template to generate a hint message.

There are several disadvantages to generating feedback using such buggy feedback and hints. Foremost, it is generally preferable to ask the student a question that requires reflection rather than reveal a portion of the solution to the problem. Conventional model-tracing systems may ask questions of the student but typically do not allow a response, than therefore the questions are merely rhetorical in nature. It is believed that student learning can be enhanced by having the tutoring system ask new, related questions, rather than just provide more information. For a student having difficulty solving a problem, the tutoring system should decompose the problem and ask the student questions about the goals that the student did not accomplish correctly as evidenced by incorrect responses. Systems that generate feedback only in this manner lack a feel of engaging in a personal dialog during a tutoring session.

What are needed, therefore, that are not provided by conventional tutoring systems, are intelligent tutoring methods and systems that leverage interactive dialog to facilitate student comprehension in connection with solving problems. Tutorial methods and systems are needed that can simulate the teaching strategies and actions of human tutors. The improved tutoring methods and systems should establish a coherent dialog that includes sub-dialogs that ask new questions without merely providing straightforward hint information. Tutoring methods and systems are needed that can recognize portions of a correct answer, provide positive feedback on those portions, and also tutor the student on the incorrect portions of the answer. The improved tutoring methods and systems should support a plurality of different tutorial strategies.

SUMMARY OF THE INVENTION

Methods and systems are provided for tutoring a student in solving a problem described in the form of a question-and-answer dialog with the student. The method employs a student model for diagnosing student input and a tutorial model for deciding what new questions to plan to ask the student. The method comprises the following steps once student input has been diagnosed by the student model: receiving the diagnosis in a tutorial processing module; generating an agenda including at least one question; applying at least one tutorial strategy to the diagnosis; and, providing feedback to the student based on application of the tutorial strategy and the agenda to the diagnosis. In certain aspects of the method, the tutorial strategy includes at least one knowledge remediation dialog and/or at least one knowledge construction dialog that can be applied to generate dialog between the tutor and the student. System embodiments are also provided that incorporate the functions of the methods for tutoring a student. In addition, in other embodiments, the present tutoring methods and systems are practiced in connection with instructions stored on a computer-readable medium.

DETAILED DESCRIPTION

Figure 1:
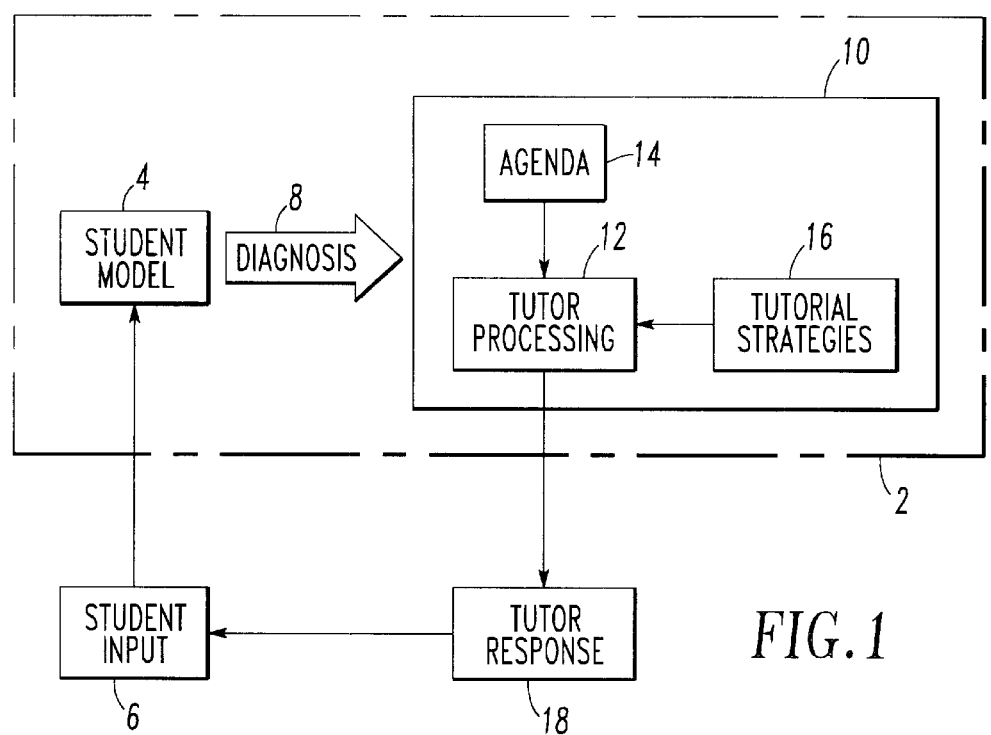
FIG. 1 is a schematic overview of a method and system for tutoring a student.

Referring now to FIG. 1, a schematic overview of a tutoring system 2 and its methodology is provided. It will be seen that the dialog-based tutorial algorithm and aspects of tutorial strategies that are employed by the algorithm build a specific dialog-based tutor for symbolic reasoning domains such as algebra, for example. A student model 4 processes a student's data entry received as student input 6 into the student model 4, in response to a problem presented to the student by the tutoring system 2. In one embodiment of the present tutorial methods and systems, the problem is an algebra-related problem. Examples of such algebra-related problems are presented below in more detailed discussion. The student model 4 processes the student input 6 and generates a diagnosis 8. A tutorial model 10 receives the diagnosis 8 and decides what further actions are to be performed by the tutoring system 2 based on the student input 6. These further actions are processed by a tutor-processing module 12 in the tutorial model 10 and can include, for example, asking a new question, providing a hint, confirming an answer, and the like. The tutor-processing module 12 can draw upon information contained in an agenda 14 and a tutorial strategies module 16 to perform its function. Once the tutorial model 10 has responded to the student input 6 with an action in a tutor response module 18, a further response from the student can be solicited as student input 6. More detailed discussion of these aspects of the present tutorial methods and systems is provided hereinafter.

As applied to the present tutorial methods and systems, an example of a tutorial rule can be provided in text as follows:
If the student has just made a response,
    And that response is correct response for the previous question asked by the tutor,
    And the student had failed to answer that question correctly,
    And the tutor had asked a more detailed question (i.e., added a new question to the agenda)
Then,
    Conclude that the student was answering the previous question,
    Give credit to the student for answering the previous question correctly
    And proceed as if the student had answered the previous question on the agenda correctly (i.e., by removing at least one intervening, more-detailed question from the agenda)

Another example of a tutorial rule can be provided as follows in the context of the present tutorial methods and systems:
If the student was just asked a question,
    And the student got that question wrong by leaving out parentheses,
Then,
    Add to the agenda two questions:
        1. The first question: "When doing order of operations, which do you evaluate first, multiplication or addition?"
        2. The second, follow-up question: "Now that you know you do multiplication before addition for this problem, what expression needs parentheses?"

With regard to the architecture of the student model 4, a model-tracing system such as one developed under the trade designation "TERTL" (Anderson & Pelletier, 1991) can be employed in connection with the tutoring system 2 as shown. Other production systems could be used for this purpose, although TERTL is particularly adapted to the task of student modeling and tutoring. The production system associated with the TERTL student model is written in the LISP programming language. It can be appreciated that a production system can be embodied as a group of "if-then" structured rules, for example, operating on a set of working memory elements (WME's). Such production rules can then be employed to model the cognitive steps a student could use to solve a problem. It can be appreciated, however, that the choice of a particular student model or a particular production system, TERTL or otherwise, is not critical to the practice of the present tutoring methods and systems.

In general, a production rule is used to represent a cognitive step performed by a student while solving a problem. For example, if a problem domain is multi-step column arithmetic, a cognitive model to solve such problems could include production rules that choose a column, process that column, and then print answers depending upon whether a carry from column to column is required. As discussed above, production rules can be written in the TERTL production system as if-then type rules. A production rule can include variable nomenclature to permit multiple ways to apply the production rule. It can be appreciated that use of production rules in this manner in the context of tutoring systems is known to those skilled in the art.

In at least one embodiment of the present tutorial methods and systems, production rules can be applied in a production system in multiple ways as illustrated below:
1. Productions that perform a goal-directed search of student input and typically operate on a quantitative network.
2. Productions related to symbolizing numbers, literals and sub-expressions. Once the model recognizes a relation used in a given problem to be solved, the model can locate and identify numbers, variables or sub-expressions.
3. Productions that determine the operator to use for a sub-expression.
4. Productions that determine the order in which to express arguments.
5. Productions that put parentheses around an expression.
6. Productions that compute an answer, or articulate the mathematics used to compute an answer.

It can be appreciated that one or more production rules associated with these categories are concatenated to simulate correct or incorrect problem-solving steps.

In one aspect of the present methods and systems, the production system of the student model 4 employs production rules that operate on WME's and uses an algorithm called model-tracing. Model-tracing is a plan recognition technique. Typically, the model-tracing algorithm is given three inputs: the state of working memory, represented by a group of working memory elements; a set of productions, wherein each production rule represents a cognitive step; and, student input for which tracing is desired. The first two inputs are collectively referred to as the student model 4. The model-tracing algorithm generally has two outputs including a Boolean value indicating whether the student input 6 was traced. If the input 6 was traced, a set of interpretations is output. Each interpretation represents a list of production rules that are chained together in a sequence. Each interpretation also represents a different set of steps that could have resulted in the student's action or response. It follows that each production rule represents an individual cognitive step.

If the model-tracing algorithm finds such a sequence, it can be said that the system traced the student input. If a response is understood, this means that the model-tracing algorithm found a list of productions that could generate the student's response. If the model-tracing algorithm fails to find a sequence of productions that could have generated the student's response, the student's response can be considered uninterpretable. If the model-tracing algorithm reports multiple different interpretations to a student's action, one of them can be selected arbitrarily. In one aspect of the present methods and systems, for example, the tutoring system can be configured to favor interpretations that do not include buggy rules or that include the fewest number of buggy rules.

In another embodiment of the tutorial methods and systems, certain student errors can be designated as common errors and a set of buggy production rules can be generated to address such common errors. These buggy production rules are used to interpret a student's input even if several portions of the response are incorrect. In short, the present methods and systems can identify multiple portions of a response that are either correct or incorrect. This permits positive feedback to be provided to the student for correct portions of a response, even when the overall answer to a question might be incorrect. For example, if the student input 6 in response to a tutor question is "5g+7(g−30)" instead of "5g+7(30−g)" where "(30−g)" is the incorrect portion of the response, the present methods and systems can provide positive feedback on the correct portions and then direct subsequent efforts to only the incorrect portion or portions.

In one embodiment of the tutorial methods and systems, the model-tracing algorithm is executed with no buggy production rules. If this succeeds, it can be concluded that the answer was entirely correct. If this fails, the model-tracing algorithm can be executed again in connection with one buggy production rule. If this now succeeds, it can be concluded that one error is present in the response. This pattern can be continued with one or more additional buggy production rules as desired for operation of the method and system. The final interpretation of the response, or a determination that the response is uninterpretable, is then transmitted to the tutorial model to determine an appropriate response. The benefit of this approach is to obtain an interpretation of the student input 6 using the least number of buggy production rules possible.

Figure 2:
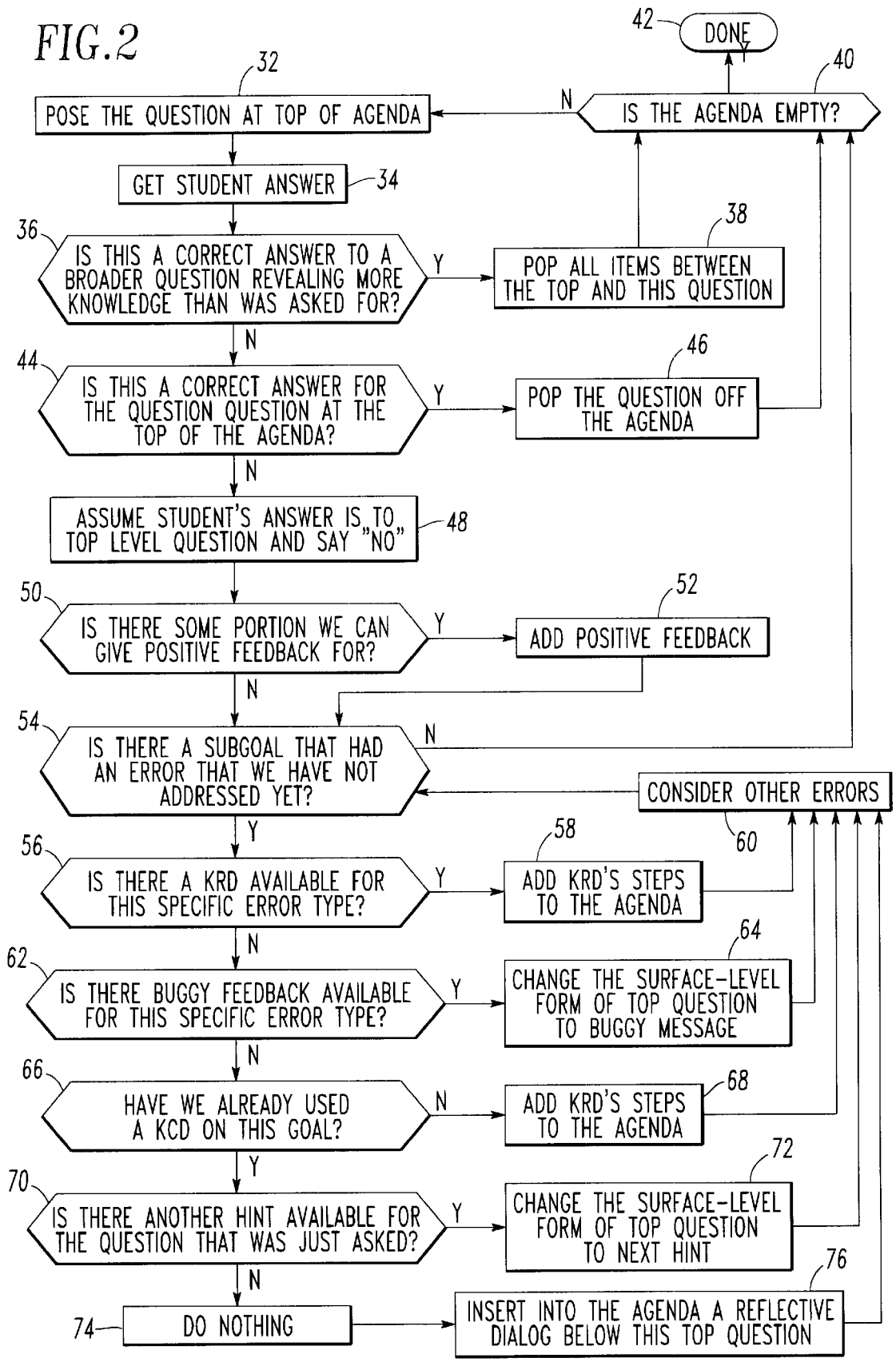
FIG. 2 is a flowchart demonstrating steps performed in connection with a method and system for tutoring a student.

Referring now to FIGS. 1 and 2, a more detailed discussion of the practice of the present tutorial methods and systems is provided. FIG. 2 is an overview of one embodiment of a tutorial method and system presented in flowchart format. The tutorial system 2 begins by posing a problem to a student in step 32 and requesting an answer from the student in step 34 to solve the problem. As discussed above, the tutorial model 10 includes an agenda 14 that is used to store a current tutorial plan, which includes items or questions related to the posed problem. The agenda 14 typically starts with one question that is a symbolization question and further includes one or more additional questions through which the student proceeds to arrive at a solution to the problem. Thereafter, as discussed in more detail below, the student model 4 diagnoses the student response or student input and passes its diagnosis to the tutorial model 10 to plan a subsequent action to take.

In step 36, the system can determine whether the student has correctly answered more than was queried, i.e., a response that reveals more knowledge than was requested by the tutoring system 2. If the student has answered more than was requested, the tutoring system 2 in step 38 removes all items or questions on the agenda 14 between the question presently being asked and the top question. The system 2 next checks the agenda 14 in step 40 for the presence of further questions in the agenda 14. If the agenda 14 is empty of items or questions, at this point, the tutoring session for the posed problem is concluded in step 42.

If the student did not answer more than was requested in step 36, the system then determines in step 44 whether the student's answer is correct or not. If the answer is correct in step 44, the system 2 removes the question from the agenda 14 in step 46 and continues processing with step 40 as previously discussed. If the answer is incorrect in step 44, the system 2 assumes the student's answer correlates with the top question on the agenda 14 and provides a negative response (e.g., the system responds "No" to the student) to the student in step 48. In step 50, the system determines whether positive feedback can be provided to the student for any portion of the response that is correct. Such positive feedback, if applicable, is provided to the student in step 52.

Next, in step 54, the tutoring system 2 decides an action for each subgoal that was diagnosed as having an error. At this point, if there are no sub-goals associated with student errors that have not yet been addressed, then the system 2 proceeds to step 40 and continues processing as previously discussed. If step 54 is answered in the affirmative, the system 2 in step 56 considers using a knowledge remediation dialog (KRD) specific to the error type encountered. If the system 2 determines in step 56 that a KRD is available for the specific error type, the system 2 adds one or more KRD's to the agenda 14 in step 58. The system 2 then proceeds to step 60 to consider whether other errors are present in the student's response and returns to step 54 for processing as previously discussed.

In step 62, the system 2 considers whether buggy feedback is available for the specific error type. If buggy feedback is available in step 62, the system 2 proceeds to step 64, wherein the form of the question asked of the student can be altered without changing the substance of the question. The system 2 then proceeds to step 60 for processing as previously discussed.

In step 66, the tutoring system 2 determines whether the question can be decomposed using a knowledge construction dialog (KCD). If this step is answered in the affirmative, one or more KCD's are added to the agenda 14 in step 68. The system 2 then proceeds to step 60 and continues processing in accordance with previous discussion of step 60. If step 66 is not met in the affirmative, then a next available hint is provided to the student in step 70. If a hint is provided in step 72, the hint changes the surface-level form of the question asked and does not change the substance of what is requested. The system then resumes processing in step 60 as previously discussed. In one aspect, the tutoring system 2 can provide the most recent question asked again, which can be considered an explicit hint message. If the system 2 arrives at a designated hint in step 74, the system 2 can decide not to provide a hint and, instead, ask a reflective follow-up question in step 76. Again, the system 2 proceeds to step 60 for further processing as previously discussed. In another aspect, if the student input 6 is deemed uninterpretable, the response can be processed as if the student made an error associated with each subgoal.

In summary, the tutorial model 10 attempts to find the most beneficial response to the diagnosis 8 of the student model 4. As discussed above, in the situation where the student has provided at least a partially incorrect response and the system can trace the student input, there can be, among others, the following possible types of responses:

1. Use a Knowledge Remediation Dialog (KRD)
2. Provide Buggy Feedback
3. Use a Knowledge Construction Dialog (KCD)
4. Provide a Hint One type of KRD, for example, can be applied if the student omits a portion of the correct response to a problem. An error of omission can be defined as a student input that is correct in what is present, but is incomplete, that is, part of the correct answer is missing. In the demonstration domain of algebra symbolization, for example, an error of omission occurs when a student correctly symbolizes only a portion of the problem. For example, if the student was supposed to respond with "800–40m" but instead provided a "40*m" response, the "40*m" is correct, but the "800–" portion is missing. Here, the tutorial system 2 can use a one-step KRD that asks the student to identify what the "40*m" represents. By comparison, a KCD is a multi-step plan that can be used to tutor any sub-expression having at least one operator. Examples of the use of KRD's and KCD's are provided herein in subsequent discussion.

The dialog-based tutorial algorithm, described herein and shown in FIGS. 1 and 2, build a specific dialog-based tutor for symbolic reasoning domains like algebra. The algorithm, as well as specific aspects of the tutorial strategies employed, are improvements over conventional methods and systems.

Table I provides an example of each of the responses associated with the tutorial model 10 within the demonstration tutor for algebra symbolization. The first column contains responses that tell the student information without changing the question. The first row in the table has tutorial responses that always apply, while the responses in the second row apply in response to certain conditions:

TABLE I

|  | Tell the Student Something | Ask a New Question or Questions |
|---|---|---|
| Can Always Apply | Model-tracing Hint at the expression level: "You need to use 40 and 'm' to find the distance rowed." | Use one of the four KCD's such as the three-step Concrete Articulation Strategy |
| Can Apply Selectively | Buggy Feedback in Model-tracing (e.g., "You are missing parentheses around the '30-g' portion"). | Use a KRD such as "Your answer of '40m' is part of the answer. What does '40m' represent in words or text?" |

In summary, an important benefit of the present tutorial methods and systems is that, when deciding between alternative possible responses, the tutorial system 2 can choose to provide a response that is specific to the student input. This generates an environment for the student that is more consistent with interacting with a human tutor.

Examples of general strategies for KCD's are listed below. These tutorial strategies are not only relevant to the example algebra symbolization domain, but are also relevant in other formal reasoning domains, particularly in mathematics and the sciences. Each strategy involves asking the student a series of questions:

1. Concrete Articulation: Scaffold or support the student in expressing a general statement by asking three questions: compute an answer for a concrete instance of that generalization; articulate the operations needed to do that computation; and generalize from the particular concrete instance to form the desired general statement.
2. Explain Verbal: Scaffold or support the student in translating a verbal problem to symbolic form by proceeding in a "bottom-up" manner asking the student three questions: identify a sub-goal to achieve; explain in words, using a simplified verbal version of the symbolic form, how the student would achieve the goal; and, translate this verbal form into a symbolic form for computing the goal. Processing student responses to these questions can be accomplished, in one aspect of the present methods and systems, by use of pull-down menus in a graphical user interface.
3. Worked Example: Tell the student the answer, that is, the target symbolization express of the given verbal problem. Then, in a "bottom-up" manner, ask the following questions to check understanding of the example: explain the components of each sub-expression; and, explain what each subgoal or component represents.
4. Decomposition and Substitution: For simple one-operator expressions, simply ask the student to symbolize it. For more complex expressions that compose together multiple operators, ask the student to: introduce variables to stand for any sub-expressions; symbolize the expression with the introduced variables; and, re-express the same goal quantity, substituting the correct expressions for the introduced variables.

Each of these strategies can be applied generally to any sub-expression that the student did not get correct. In one aspect of the present methods and systems, one of these general strategies is arbitrarily set by the system. It can be appreciated that an algorithm can be developed to suggest an appropriate strategy specific to problem type, types of errors detected, factors specific to a student or group of students, and other factors.

Figure 3:
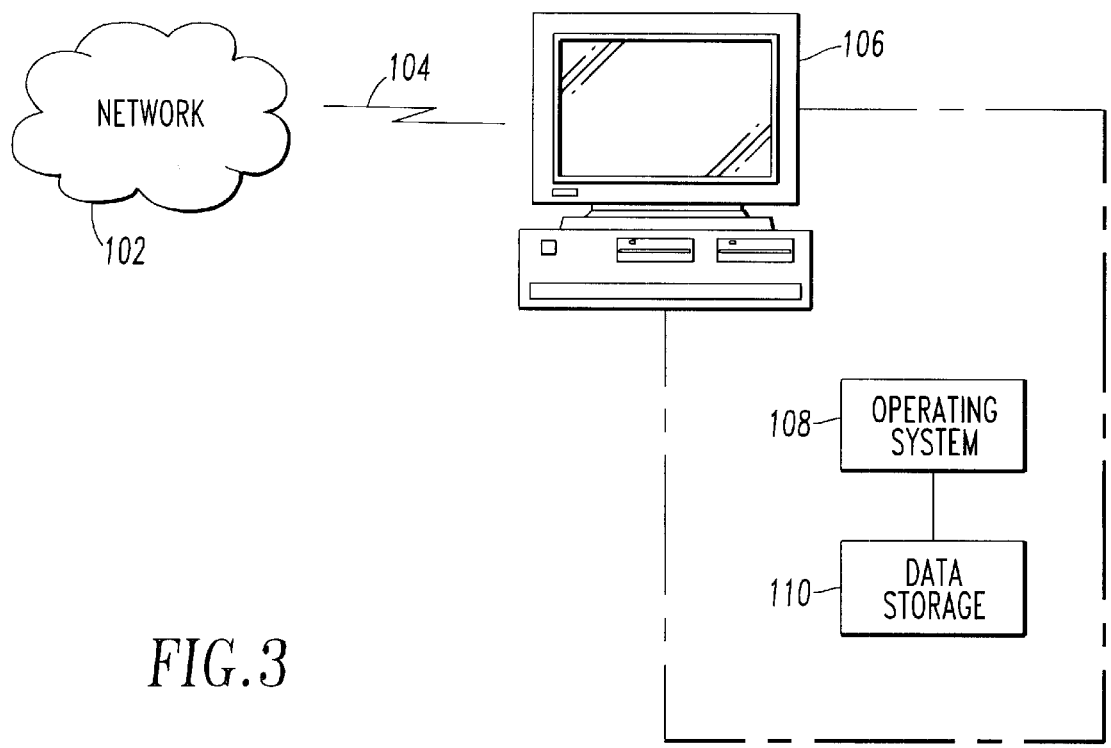
FIG. 3 is schematic system diagram of a tutoring system.

Referring now to FIG. 3, a schematic of one system implementation of the tutorial system is provided. A network 102, which can be an internal, networked computer system or a global networked communications medium such as the Internet, for example, is operatively connected through a connection 104 to a computer 106. The tutorial methods and systems can be embodied, for example, as a set of instructions included on a computer-readable medium executed by an operating system 108 and stored in a data storage portion 110 of the computer 106. The computer-readable medium can include hard disk storage, diskette, CD-ROM, the data transfer medium between the network 102 and the computer 106, or another functionally equivalent computer-readable medium.

In one aspect, a student can access at least a portion of the tutorial system by using the computer 106 to obtain and execute a computer program from the network 102 and/or from data storage 110 that performs the steps of the methods described herein. It can be appreciated that the computer 106 can be replaced by a client-server arrangement, a wireless device such as a personal digital assistant (PDA), or another electronic device suitable for executing the tutorial system. In addition, it can be understood that instructions for performing the present methods and systems can be executed on a stand-alone basis without the network connection shown. The tutorial system can be implemented, for example, as a series of graphical user interfaces on a personal computer with conventional windows, drop-down menus, and similarly functionally equivalent features.

EXAMPLES

The following examples are intended to provide potential embodiments of the methods and systems discussed herein. It can be appreciated that these examples are provided for purposes of illustration and to demonstrate practice of the present methods and systems for those skilled in the art. No particular aspect or aspects of these examples are intended to limit the scope of the invention. Choice of a particular nomenclature, variable representation, or type of mathematical problem, for example, is intended merely to illustrate a potential embodiment of the methods and systems discussed herein.

In one aspect of the present methods and systems, the tutoring system is used to tutor a student in algebra type problems. The following are potential problem types that can be employed in connection with this algebra tutor embodiment:

| Problem Type | Example Problem |
|---|---|
| One-Operator Problems. | The carnival committee is dividing up the whole field for carnival booths. If there are "x" booths and the area of the field is 400 square yards, write an expression for the area each booth gets. |
| One-Operator involving distance, rate and time. | Rose Mary needed to drive to Houston, Texas that was "x" miles away. If she planned on driving 55 miles per hour, how long is the ride going to take her? |
| Two-Operator linear forms. | Anne is rowing a boat in a lake and is 800 yards from the dock from which she started. She rows back towards the dock at 40 yards per minute for "m" minutes and stops to rest. How far is she from the dock now? |
| Two-Operator with some involving division and parenthesis. | You go on a bike ride. You ride at a speed of "s" miles per hour. You bike "m" miles. You take an "h" hour break. Write an expression for how long the trip took. |

-continued

| Problem Type | Example Problem |
|---|---|
| Three and Four Operator Problems | Debbie has two jobs over the summer. At one job she bags groceries at Giant Eagle and gets paid 5 dollars an hour. At the other job she delivers newspapers and gets paid 7 dollars an hour. She works a total of 30 Hours a week. She works "g" hours bagging groceries. Write an expression for the total amount she earns a week. |

A student can be presented with a problem in which symbolization of an algebra expression is requested for a given quantity expressed as a text phrase (e.g., "Write an expression for the distance Ann rowed."). If the student gets the problem correct, the system checks to see if the student has reached the mastery criterion for that section. One mastery criterion can be getting some fixed number of problems correct on a first attempt in a row. If the student does not get the problem correct, the present methods and systems engage the student in a dialog to help the student learn the desired skills. Once that dialog is complete, the student is given a new problem in the same problem type or can progress to other problem types.

A quantitative network can be represented and applied by the present methods and systems. To tutor a new problem, the system author encodes the relevant information (see Table II—below). Consider the following illustrative problem:

Anne is rowing a boat in a lake and is 800 yards from the dock from which she started. She rows back towards the dock at 40 yards per minute for "m" minutes and stops to rest. How far is she from the dock now?

In the context of the problem, the author specifies a text phrase for each quantity (e.g., "the distance rowed so far"), the units of that quantity (e.g., "yards"), the dimension of that quantity (e.g., "distance"), and the algebraic expression for that quantity (e.g., "40*m"). Additionally, for each quantity that is a variable, the author must specify a concrete instance to use in the place of that variable. This number (e.g., "3" for "m") is used for the concrete articulation strategy. Specifically, for the above problem, the following shows the information that is encoded in a problem file in the system:

TABLE II

| Verbal Phrase | Dimension | Units | Symbolization | Concrete Instance |
|---|---|---|---|---|
| The distance Anne has left to row | Distance | Yards | 800–40 m | |
| The distance rowed so far | Distance | Yards | 40 * m | |
| Her speed rowing | Speed | Yards per minute | 40 | |
| The number of minutes rowing | Time | Minutes | m | 3 |
| The distance she started from the dock | Distance | Yards | 800 | |

As can be seen, each row in Table II represents a quantity in the problem. The problem author encodes a verbal phrase, dimension, units and symbolization. The quantity represented by "The number of minutes rowing" has two symbolizations (i.e., "m" and "40"). The first is the variable presented in the problem statement. The second is used as a concrete instance as part of the concrete articulation strategy.

A concrete instance is usually a small number, but it must also be reasonable in the context of the problem. For instance, 3 is probably not a reasonable number for the speed of a jet in miles per hour since jets typically fly faster. An instance is a number that makes mathematical calculation as convenient as possible, such as by avoiding fractions in the answer. An instance also should not result in confusion between different quantities. For instance, "20" for "m" as both "the distance rowed so far" and "the distance Ann has left to row" would result in duplicate "800" values.

Figure 4:
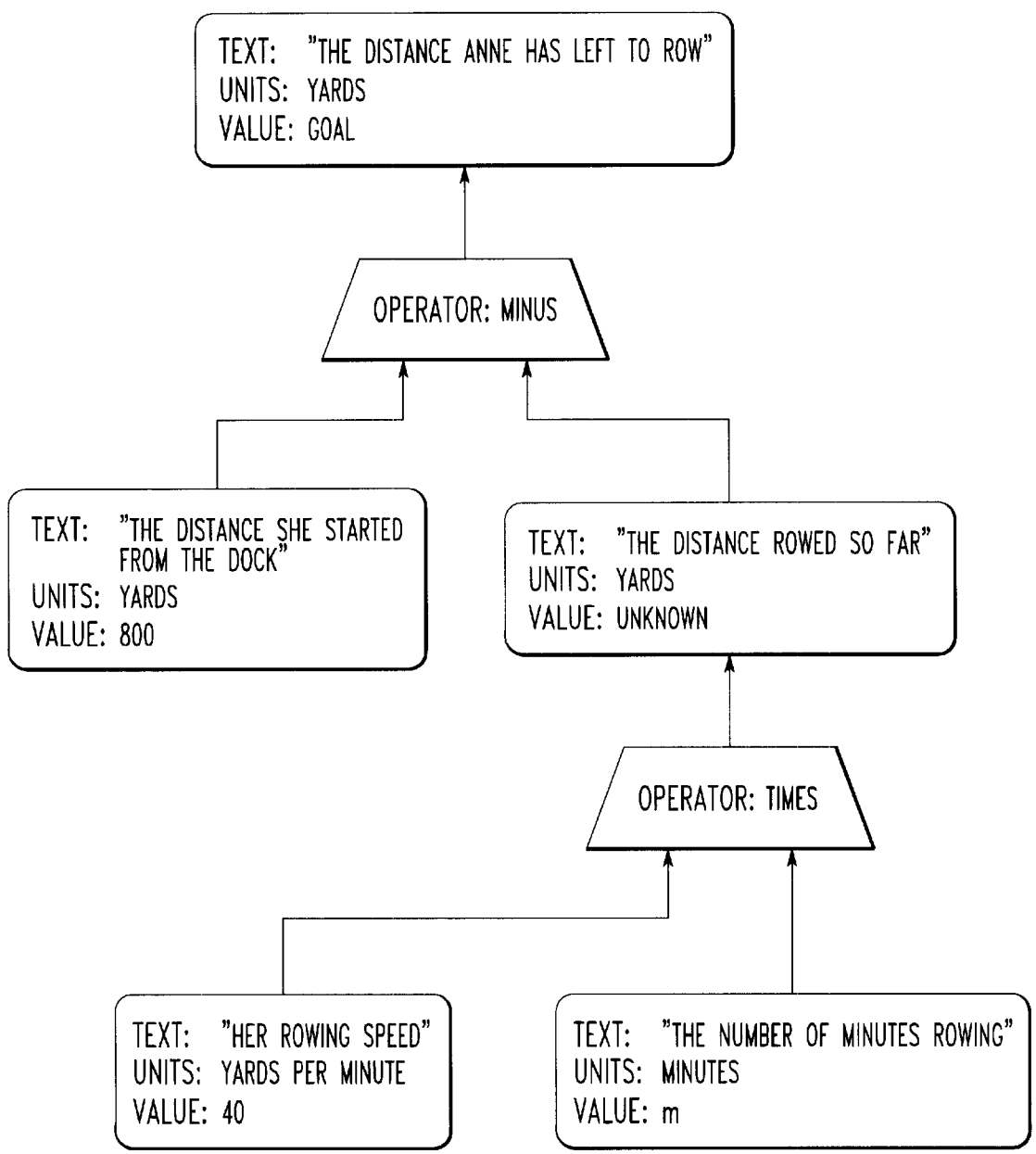
FIG. 4 is a flowchart illustrating an example of an aspect of a method and system for tutoring a student.

Referring now to FIG. 4, this information can be encoded into WME's as shown by the flowchart format into a quantitative network. This quantitative network shows an example involving five quantity WME's and two relation working memory elements. Each WME has a type that defines a list of slot names (e.g., "TEXT", "UNITS", and "VALUE"). Two different types of WME's (e.g., quantities and relations) are shown. The present tutorial methods and systems use this set of WME's to understand a student's attempt at the problem. For example, the system "knows" that the quantity for the "distance rowed so far" has an unknown value and is involved in two relations that could possibly be used to find the value for that quantity. The tutorial system can determine that the "distance rowed so far" can be computed by using the operator "times" and the two quantities whose text are "speed of rowing" and the "time rowing." This knowledge is represented in associated production rules.

As an example of a production rule, the tutorial system can be programmed to know when to add parentheses around an expression. The following production rule is used to add parentheses around an expression if it is the second argument. (e.g., "7*(30–g)"). There is a separate rule for adding parentheses if the sub-expression is the first argument or on the left (e.g., "(30–g)*7"). Here is a sample production rule with the variables Q, Q2,Op1, Op2, A1,A2, A3 and A4:

If goal is to express Q in algebra
  And Q is found by Q1Op1 Q2
  And Q1 is expressed as A1
  And Q2 is expressed as A2
  And A2 is found my A3 Op2 A4
  And Op1 has higher precedence then Op2
Then
  Set a goal to write A1
  And write Op1
  And write "("
  And set goal to write A2
  And write ")"

So, if the following problem is posed:

Debbie has two jobs over the summer. At one job, she bags groceries at Giant Eagle and is paid 5 dollars an hour. At the other job, she delivers newspapers and is paid 7 dollars an hour. She works a total of 30 Hours a week. She works "g" hours bagging groceries. Write an expression for the total amount she earns a week.

The production rule could be instantiated with the following variables:

Q="the pay from the newspaper"
Q1="the pay rate for delivering papers"
A1=7
Op1="*"
Q2="the hours delivering newspapers"
A2=30–g
A3="30"
Op2="–"
A4="g"

This production rule would generate "7*(30–g)".

The above example shows a production rule that knows when to put parentheses into a response. The present tutorial methods and systems also can have, for example, a buggy rule that models a common student error, such as leaving off the parentheses from a response when parentheses are required:

If goal is to express Q in algebra
    And Q is found by Q1Op1 Q2
    And Q1 is expressed as A1
    And Q2 is expressed as A2
    And A2 is found my A3 Op2 A4
    And Op1 has higher precedence then Op2
Then
    Set a goal to write A1
    And write Op1
    And set goal to write A2

This rule could be used to model a student that ignores operator precedence and does not use parentheses.

In addition, an example of the structure and operation of the agenda in the present methods and systems can be provided. With regard to the following dialog between tutor and a human, tenth grade student, each entry is date-stamped and time-stamped and also gives the elapsed time in the last set of square brackets. For instance, at line 2 the computer took zero seconds to generate the question, while at line 3 the student took 76 seconds to generate "(y*3)". Each question then gives the question's type (indicated with "qtype="). For this example, the question types are either QSYMB for symbolization, QCOMPUTE for arithmetic, QEXPLAIN for the articulation step, or QGENERALIZE for the generalization question. Additionally, each question is tagged with a goal that gives one of the possible correct ways to answer the question (e.g., at line 2 the correct answer is an expression that is equivalent to "y+3*y"). The student's responses are listed in bold:

1. <Problem_Statement>You are mixing paint. You start with "y" liters of yellow paint and then you must add 3 times as much red as you did yellow. Write an expression for the amount of paint you used.</Problem_Statement>
2. <Tutor time="[7/24/2000][19:1:42][0]" qtype="QSYMB"goal="y+3*y">Hello. Please write an expression for the total amount of paint you used. </Tutor>
3. <Student time="[7/24/2000][19:2:58][76]">(y*3)</Student>
4. <Tutor time="[7/24/2000][19:2:59][0]" qtype="QCOMPUTE" goal="20"> Hmm. No. We will come back to the total amount of paint you used. Let me try to break this down for you. Please compute the total amount of paint you used if the amount of yellow paint was 5 liters? </Tutor>
5. <Student time="[7/24/2000][19:3:24][26]">5*3</Student>
6. <Tutor time="[7/24/2000][19:3:24][0]" qtype="QCOMPUTE" goal="15"> Hmm. No. Let me ask you a different question. Please compute the amount of red paint you used if the amount of yellow paint was 5 liters? </Tutor>
7. <Student time="[7/24/2000][19:3:47][22]">15</Student>
8. <Tutor time="[7/24/2000][19:3:47][0]" qtype="QCOMPUTE" goal="20">Correct. Now, lets try this question again: Please compute the total amount of paint you used if the amount of yellow paint was 5 liters? </Tutor>
9. <Student time="[7/24/2000][19:4:3][16]">15</Student>
10. <Tutor time="[7/24/2000][19:4:3][0]" qtype="QCOMPUTE" goal="20"> Hmm. No. Try again please. If the amount of yellow paint was 5 liters instead of "y" what would the total amount of paint you used be?</Tutor>
11. <Student time="[7/24/2000][19:4:34][31]">20</Student>
12. <Tutor time="[7/24/2000][19:4:34][0]" qtype="QEXPLAIN" goal="5+3*5">Correct. Using only 3, and 5 write an expression for the total amount of paint you used.</Tutor>
13. <Student time="[7/24/2000][19:5:19][45]">(3*5)+5</Student>
14. <Tutor time="[7/24/2000][19:5:19][0]" qtype="QGENERALIZE" goal="y+3*y">Correct. Now use "y" instead of 5 to again express the total amount of paint you used.</Tutor>
15. <Student time="[7/24/2000][19:6:3][44]">(3*y)+5</Student>
16. <Tutor time="[7/24/2000][19:6:3][0]" qtype="QGENERALIZE" goal="y+3*y">It looks like you didn't understand what I was asking you. You should use the variables from the problem. For instance, use y instead of 5. Try this question again: Now use "y" instead of 5 to again express the total amount of paint you used.</Tutor>
17. <Student time="[7/24/2000][19:6:36][34]">(3*y)+Y</Student>
18. <Tutor time="[7/24/2000][19:6:36][0]" qtype="NIL" goal="NIL">Correct. A new problem is needed </Tutor>

In the above dialog, the student initially provided a "(3*y)" response. The tutorial system chose to use the concrete articulation strategy arbitrarily among its four KCD's. In this situation, the strategy involves three steps:

---

Qcompute: Total Paint: 20
QExplain: Total Paint: 5 + 3 * 5
QGeneralize: Total Paint: y + 3 * y

---

The diagram (immediately above) is meant to show the state of the agenda after the system has responded at line 4. Thus, it can be seen that the agenda contains questions that the tutor plans to ask in the future, and therefore, the agenda captures the tutorial plan at any given point. The questions on top are asked before the questions on the bottom. The student went on to answer the question at line 5 incorrectly with a "5*3" response. Because the tutor knew how to break down that question, it did so. This involved adding an extra computational question to the stack so that the agenda looked like the following list:

---

Qcompute: Red Paint: 15
Qcompute: Total Paint: 20
QExplain: Total Paint: 5 + 3 * 5
QGeneralize: Total Paint: y + 3 * y

---

At line 7, the student answered the top-level question correct so the tutor removed that question from the top of the agenda. The student is presented again with the same question from line 4. The agenda now looks like the following list:

```
Qcompute: Total Paint: 20
QExplain: Total Paint: 5 + 3 * 5
QGeneralize: Total Paint: y + 3 * y
```

At line 9, the student answers the question wrong, but since we have already done one KCD on this step the tutor instead gives a hint. A hint only changes how the top-level question is phrased. It is not viewed as a new question. In this case the first level hint simply asks the student to try again. If the student had made another error the hint message would get more explicit about what the student should do. However, it turns out that this hint is sufficient to get the student to answer the question correctly at line 11. Then the tutor presents the articulation question. The agenda looks like the following list:

```
QExplain: Total Paint: 5 + 3 * 5
QGeneralize: Total Paint: y + 3 * y
```

The student gets the next two questions correct (line 13 and 15) and each time they are removed from the agenda. After line 17, the tutor's agenda is empty and a completely new problem is selected.

The following example illustrates a problem inherent to systems that ask new questions: the student may misunderstand the wording of the question. The system needs to recognize such misunderstanding and respond appropriately:

1. <Problem_Statement>Latisha, Kendra and Tonya worked all summer mowing lawns. Tonya made "t" dollars and Latisha made twice as much as Tonya. Kendra worked the hardest and made three times as much as both of the other girls combined. Write an expression for the amount of money Kendra made mowing lawns.</Problem_Statement>
2. <Tutor time="[7/24/2000][18:54:53][1]" qtype="QSYMB" goal="(t*2+t)*3">Hello. Please write an expression for the amount Kendra made. </Tutor>
3. <Student time="[7/24/2000][18:56:23][90]">t*2*3</Student>
4. <Tutor time="[7/24/2000][18:56:23][0]" qtype="QCOMPUTE" goal="24">No. But, "t*2" is correct for the amount Latisha made. We will come back to the amount Kendra made. Let me try to break this down for you. Please compute the combined amount of Latisha and Tonya if the amount Tonya made was 8 dollars? </Tutor>
5. <Student time="[7/24/2000][18:57:25][62]">24</Student>
6. <Tutor time="[7/24/2000][18:57:25][0]" qtype="QEXPLAIN" goal="8*2+8">Correct. Using only 2, and 8 write an expression for the combined amount of Latisha and Tonya.</Tutor>
7. <Student time="[7/24/2000][18:58:9][45]">t*2*8</Student>
8. <Tutor time="[7/24/2000][18:58:10][0]" qtype="QEXPLAIN" goal="8*2+8">It looks like you didn't understand what I was asking you. For this question, you should not use variables: For instance, use 8 here instead of "t". Try this question again: Using only 2, and 8 write an expression for the combined amount of Latisha and Tonya.</Tutor>
9. <Student time="[7/24/2000][18:58:33][23]">2*8</Student>
10. <Tutor time="[7/24/2000][18:58:33][0]" qtype="QEXPLAIN" goal="8*2+8">No.[sic programming error results in saying 'No. No.'] No. Your answer of "2*8" equals "16", but you wanted to write an expression that equaled "24". Using only 2, and 8 write an expression for the combined amount of Latisha and Tonya. Hint: Use 8*2 for the amount Latisha made and 8 for the amount Tonya made. </Tutor>
11. <Student time="[7/24/2000][18:59:16][43]">8*2+8</Student>
12. <Tutor time="[7/24/2000][18:59:16][0]" qtype="QGENERALIZE" goal="t*2+t">Correct. Now use "t" instead of 8 to again express the combined amount of Latisha and Tonya.</Tutor>
13. <Student time="[7/24/2000][18:59:39][23]">t*2+8</Student>
14. <Tutor time="[7/24/2000][18:59:39][0]" qtype="QGENERALIZE" goal="t*2+t">It looks like you didn't understand what I was asking you. You should use the variables from the problem. For instance, use t instead of 8. Try this question again: Now use "t" instead of 8 to again express the combined amount of Latisha and Tonya.</Tutor>
15. <Student time="[7/24/2000][19:0:10][32]">t*2+8</Student>
16. <Tutor time="[7/24/2000][19:0:10][0]" qtype="QGENERALIZE" goal="t*2+t">It looks like you didn't understand what I was asking you. You should use the variables from the problem. For instance, use t instead of 8. Try this question again: Now use "t" instead of 8 to again express the combined amount of Latisha and Tonya.</Tutor>
17. <Student time="[7/24/2000][19:0:22][13]">t*2+t</Student>
18. <Tutor time="[7/24/2000][19:0:22][0]" qtype="QSYMBWRAPUP" goal="(t*2+t)*3">Correct. Now, lets try this question again: Please write an expression for the amount Kendra made. </Tutor>
19. <Student time="[7/24/2000][19:1:1][38]">t*2+t*3</Student>
20. <Tutor time="[7/24/2000][19:1:1][0]" qtype="QSYMBWRAPUP" goal="(t*2+t)*3">No. You need to put parentheses around the "t*2+t". Try again. Please write an expression for the amount Kendra made. </Tutor>
21. <Student time="[7/24/2000][19:1:42][41]">(t*2+t)*3</Student>
22. <Tutor time="[7/24/2000][19:1:42][0]" qtype="NIL" goal="NIL">Correct. A new problem is needed </Tutor>

This example illustrates positive feedback, dialog coherence moves, dealing with misunderstanding of the questions, and negative feedback that does not merely tell the student the answer.

With regard to positive feedback, the first response of the tutor shows the tutor saying that the answer is wrong, but providing positive feedback for a portion of the answer. The tutor also interpreted the "*3" as correct, but being applied to "2t" instead of the quantity "t+2t", which is what the tutor was expecting. Therefore, the tutor chose to scaffold the goal of "the combined amount of Latisha and Tonya." The tutor has strategies at its disposal to scaffold any sub-expression. The tutor arbitrarily used the concrete articulation strategy on this subgoal. The concrete articulation strategy involves adding to the tutorial agenda three questions, on top of the question that is already on the agenda. The agenda now looks like the following list:

---
QCOMPUTE: with t = 8 to get an answer of 24
QEXPLAIN: 8 + 2 * 8
QGENERALIZE: t + 2 * t
QSYMB: (t + 2t) * 3
---

In addition, the system uses phrases like "Let me try to break this down for you" (line 4) and "Let's try this question again" (line 18) as appropriate to maintain overall coherence of the dialog. An example of this is shown (at line 4) by the tutor, when the tutor says, "We will come back to the amount Kendra made. Let me try to break this down for you." The tutor is warning the student that a new question is coming.

As discussed above, the tutor chose to ask a compute question. The student answers the question correctly with "24". But the next question asks the student to articulate the math that was used to get that "24", and the student does not understand, so the tutor says (line 8), "It looks like you didn't understand what I was asking you. For this question, you should not use variables: For instance, use 8 here instead of "t". The student followed the direction of the tutor not to use a variable in her answer, but still was unable to explain how she produced the "24" response.

Next (at line 10), the tutor provided constructive negative feedback: a "No. Your answer of '2*8' equals '16', but you wanted to write an expression that equaled '24'" response. The tutor followed that with a hint. The student was then able to get the correct answer and was then asked to generalize the answer. However, the student did not understand and used the concrete number to help in the compute question, so the tutor responds (line 14): "It looks like you didn't understand what I was asking you. You should use the variables from the problem. For instance, use t instead of 8." This misunderstanding took two attempts before it was addressed.

This example concludes with the student making an error of not using parentheses. The tutor chooses the response with an appropriate pedagogical response. In this case, the tutor says (line 20) "You need to put parenthesis around the 't*2+t'".

In some situations, the tutorial model's diagnosis is that the student's answer appears to be answering a different question, or possibly answering in a way that reveals more knowledge than what was asked. As discussed above, if the student's answer reveals more knowledge than was asked, the tutoring system should confirm the student's response and then proceed. For instance, in the following problem, the student appears not to notice that at line 4 a new question was asked. The student's quick response time also seems to indicate that the student was trying to quickly correct his answer, not realizing the system asked a new question. The student did not get the top-level question correct, so the system did not give the student credit. On line 7 the student does get the top-level question correct, and the system gives him credit:

1. <Problem_Statement>A plumber not only charges $30 per hour but she also charges $15 just to come to your house. Write an expression for how much you have to pay if this plumber works for "h" hours.</Problem_Statement>
2. <Tutor time="[7/18/2000][8:48:19][0]" qtype="QSYMB" goal="15+30*h">Hello. Please write an expression for the total you pay the plumber. </Tutor>
3. <Student time="[7/18/2000][8:49:0][41]">30+15*h</Student>
4. <Tutor time="[7/18/2000][8:49:0][0]" qtype="QSUB_QUAN_STRICTLY" goal="30*h"> Hmm. No. We will come back to the total you pay the plumber. Let me try to break this down for you. What is the amount she makes without the house call charge?</Tutor>
5. <Student time="[7/18/2000][8:49:10][10]">30+15/h</Student>
6. <Tutor time="[7/18/2000][8:49:11][0]" qtype="QSUB_QUAN_STRICTLY" goal="30*h"> Hmm. No. Use "30" and "h" to calculate the amount she makes without the house call charge.</Tutor>
7. <Student time="[7/18/2000][8:49:31][21]">30*h+15</Student>
8. <Tutor time="[7/18/2000][8:49:31][10]" qtype="NIL" goal="NIL">Correct. A new problem is needed </Tutor>

Though it is true that the student can always proceed to another problem, if the student can type the answer to the first symbolization question, the present tutoring methods and systems can be subtle in their approach. Consider the following example:

1. <Problem_Statement>Debbie has two jobs over the summer. At one job she bags groceries at Giant Eagle and gets paid 5 dollars an hour. At the other job she delivers newspapers and gets paid 7 dollars an hour. She works a total of 30 Hours a week. She works "g" hours bagging groceries. Write an expression for the total amount she earns a week.</Problem_Statement>
2. <Tutor time="[10/10/2000][18:29:55][0]" qtype="QSYMB" goal="5*g+7*(30−g)">Hello. Please write an expression for the total pay per week. </Tutor>
3. <Student time="[10/10/2000][18:35:37][343]">(30−g*7)+(g*5)</Student>
4. <Tutor time="[10/10/2000][18:35:38][0]" qtype="QSUB_QUAN_NOT_STRICTLY" goal="7*B"> No. But, "30−g" is correct for the hours delivering newspapers, and "g*5" is correct for the pay from the grocery. We will come back to the total pay per week. Let me try to break this down for you. If "B" was the hours delivering newspapers then what would be the pay from the newspaper? </Tutor>
5. <Student time="[10/10/2000][18:37:25][108]">30−g (*7)</Student>
6. <Tutor time="[10/10/2000][18:37:25][0]" qtype="QSUB_QUAN_NOT_STRICTLY" goal="7*B">It looks like you didn't understand what I was asking you. That is not a valid math expression. Try this question again: If "B" was the hours delivering newspapers then what would be the pay from the newspaper? </Tutor>
7. <Student time="[10/10/2000][18:37:58][33]">7*(30−g)</Student>
8. <Tutor time="[10/10/2000][18:37:58][0]" qtype="QSYMBWRAPUP" goal="5*g+7*(30−g)">Correct. Now, lets try this question again: Please write an expression for the total pay per week. </Tutor>
9. <Student time="[10/10/2000][18:38:20][21]">7*(30−g)+(g5)</Student>
10. <Tutor time="[10/10/2000][18:38:20][0]" qtype="NIL" goal="NIL">Correct. A new problem is needed </Tutor>

Note the positive feedback (line 4) that is part of the dynamic scaffolding of the present methods and systems.

The student commits an error only of forgetting parentheses around the "30–g". The tutor therefore adds two questions to the agenda making the agenda look like the following list:

QSUB_QUAN_NOT_STRICTLY: 7 * b
QSUBSTITUTE: 7 * (30 – g)
QSYMB: 5 * g + 7 * (30 – g)

The student then invokes a buggy rule from the system by typing "30–g(*7)" (line 5) and is told his answer is not a valid math expression. This answer apparently attempts to avoid the question that seeks "7*b" as a response. At line 7, the student answers and the system registers that the student answered a question lower on the agenda, gives credit, and then removes two questions from the agenda.

An example of the "Explain in English First" tutorial strategy is provided as follows with two primary steps:
1. First ask the student to explain in text (e.g., using pull down menus) how to achieve a goal; and,
2. Follow this question by symbolizing that subgoal.

This strategy employs dynamic scaffolding to identify which of the goals need assistance, and then asks two questions for each sub-goal. When there is more than one error in the student input, the system can elect to proceed in a bottom-up manner.

The following sample tutorial session shows how this "Explain in English First" strategy is applied to a bike-trip problem. This example shows an instance of a student making an error only at the top-level goal (i.e., using "–" instead of "+"):

1) <Problem_Statement> You go on a bike ride. You ride at a speed of "s" miles per hour. You bike "m" miles. You take an "h" hour break. Write an expression for how long the trip took. </Problem_Statement>
2) <Tutor time="[12/5/2000][8:10:13][13]" qtype= "QSYMB" goal="h+m/s">Hello. Please write an expression for the total time the trip took. </Tutor>
3) <Student time="[12/5/2000][8:11:18][65]">m/s–h</Student>
4) <Tutor time="[12/5/2000][8:11:18][0]" qtype= "QEXPLAIN_VERBAL" goal="h+m/s"> No. But, "m/s" is correct for the time actually on bikes. We will come back to the total time the trip took. Let me try to break this down for you. Can you explain how you would find the total time the trip took?</Tutor>
5) <Student time="[12/5/2000][8:13:9][111]">the total time the trip took is equal to the time actually on bikes plus the hours for break.</Student>
6) <Tutor time="[12/5/2000][8:13:9][0]" qtype="Q_SYMB_AFTER_VERBAL" goal="h+m/s">Correct. Now, follow that up by writing an expression for the total time the trip took</Tutor>
7) <Student time="[12/5/2000][8:13:28][19]">m/s+h</Student>
8) <Tutor time="[12/5/2000][8:13:28][0]" qtype="NIL" goal="NIL">Correct. A new problem is needed </Tutor>

At line 3, the student correctly symbolizes the time actually spent on bikes but incorrectly added the hours for the break. The tutor responded by confirming the portion that was done correctly and then asking the student to explain in text the top-level goal (i.e., the total time the trip took). For this response, the student is presented with a fill-in-the-blank question introduced by a "The total time the trip took is equal to" phrase. This question is then followed by three choice menus. The first and second choice menus contain the five phases describing quantities from the problem, shown as follows:

| The phrases in the 1st and 3rd Menus |
| --- |
| The actual time on bikes |
| The distance ridden |
| The hours for break |
| The time actually on bikes |
| The total time the trip took |

The second choice menu contains the following operation descriptors:

| The phrases in the 2nd menu |
| --- |
| Plus |
| Minus |
| Times |
| Divided by |

At line 5, it can be seen that the student correctly explained how to compute the total time, so the tutor asked the student to express the same response but with symbols. As shown, the student did this correctly.

An example of the "Introduce a New Variable" tutorial strategy can be provided in the context of the bike-trip problem:

1) <Problem_Statement>You go on a bike ride. You ride at a speed of "s" miles per hour. You bike "m" miles. You take an "h" hour break. Write an expression for how long the trip took. </Problem_Statement>
2) <Tutor time="[12/6/2000][4:43:8][1]" qtype= "QSYMB" goal="h+m/s">Hello. Please write an expression for the total time the trip took. </Tutor>
3) <Student time="[12/6/2000][4:45:10][122]">m/(s+h) </Student>
4) <Tutor time="[12/6/2000][4:45:10][0]" qtype= "QSUB_QUAN_STRICTLY" goal="m/s"> Hmm. No. We will come back to the total time the trip took. Let me try to break this down for you. What is the time actually on bikes?[1]</Tutor>
5) <Student time="[12/6/2000][4:46:15][65]">m/s</Student>
6) <Tutor time="[12/6/2000][4:46:15][0]" qtype= "QSUB_QUAN_NOT_STRICTLY" goal="h+ B">Correct. If "B" was the time actually on bikes then what would be the total time the trip took? </Tutor>
7) <Student time="[12/6/2000][4:46:53][38]">B+h</Student>
8) <Tutor time="[12/6/2000][4:46:53][0]" qtype= "QSUBSTITUTE" goal="h+m/s">Correct. Now, lets try this question again: You are correct that "h+B" is the total time the trip took. Now, can you state this in terms of the numbers given in the problem?</Tutor>
9) <Student time="[12/6/2000][4:47:37][44]">m/s+h</Student>
10) <Tutor time="[12/6/2000][4:47:37][0]" qtype="NIL" goal="NIL">Correct. A new problem is needed </Tutor>

[1] Notice that this question generated using just dynamic scaffolding and has no tutorial strategy associated with this. An object of future work will be to figure out the best way of combine these strategies. One idea is to use "Concrete Articulation" strategy for expression that involves just one operator, and to use the "Introduced Variable" strategy for all large (one than one operator) expression components.

The theory of this strategy is that if it is desired that a student should symbolize an expression (i.e., "m/s+h"), and that expression involves more than one operation (i.e., both division and addition), the correct response can be broken into steps corresponding to each operation. This strategy ensures that the components of the response (i.e., "m/s" and "h") have been symbolized correctly (such as by asking the student, "What represents the time of the break?"). Two steps are then provided as follows:

1. Introduce variables to stand for any components (see line 6); and,
2. Then ask the student to do the symbolic substitution to remove the introduced variables (see line 8).

In addition, an example of the "Convert the Problem into an Example to Explain" tutorial strategy can be provided in the context of the bike-trip problem:

1. <Problem_Statement>You go on a bike ride. You ride at a speed of "s" miles per hour. You bike "m" miles. You take an "h" hour break. Write an expression for how long the trip took. </Problem_Statement>
2. <Tutor time="[12/14/2000][14:20:38][1]" qtype="QSYMB" goal="h+m/s">Hello. Please write an expression for the total time the trip took. </Tutor>
3. <Student time="[12/14/2000][14:20:52][14]">m*s-b</Student>
4. <Tutor time="[12/14/2000][14:20:52][0]" qtype="QEXAMPLE_EXPLAIN" goal="m/s"> Hmm. No. The answer is actually h+m/s. Let me ask you some questions to help you understand it. Can you explain where the m/s came from?</Tutor>
5. <Student time="[12/14/2000][14:21:8][16]">m/s is equal to the distance ridden divided by the speed ridden.</Student>
6. <Tutor time="[12/14/2000][14:21:8][0]" qtype="Q_WORKED_REPRESENT" goal="the time actually on bikes">Correct. What does m/s represent?</Tutor>
7. <Student time="[12/14/2000][14:21:18][10]">the time actually on bikes</Student>
8. <Tutor time="[12/14/2000][14:21:46][0]" qtype="QEXAMPLE_EXPLAIN" goal="h+m/s"> Hmm. No. Can you explain where the h+m/s came from? Hint: You need to use the hours for break and the time actually on bikes.</Tutor>
9. <Student time="[12/14/2000][14:22:4][18]">h+m/s is equal to the hours for break plus the time actually on bikes.</Student>
10. <Tutor time="[12/14/2000][14:22:4][0]" qtype="Q_WORKED_REPRESENT" goal="the total time the trip took">Correct. What does h+m/s represent?</Tutor>
11. <Student time="[12/14/2000][14:22:17][13]">the total time the trip took </Student>
12. <Tutor time="[12/14/2000][14:22:17][0]" qtype="NIL" goal="NIL">Correct. A new problem is needed </Tutor>

In summary, the present tutoring methods and systems include reasoning that is both strategic (i.e., has general multi-step plans that can be used to breakdown problems) and tactical (i.e., can recognize and respond to teachable moments). The use of the agenda data structure to provide for the dialog management, for example, provides the present tutorial system with its strategic character. If the student makes a mistake, a sub-dialog can be presented to address that mistake. The tutorial system can apply a tutorial strategy (e.g., a knowledge remediation dialog or buggy feedback) specific to the error made by the student. In addition, the tutorial system can respond with a knowledge construction dialog that uses a multi-step plan to respond to a student's error with a particular dialog strategy.

Furthermore, the present methods and systems respond differently according to what has previously happened in the dialog. The first time the student makes an error on a given question, for example, the student can be associated with a tutorial plan. In connection with execution of the tutorial plan, the tutoring system can return to a question that is substantively the same but phrased differently.

Therefore, the methods and systems described herein demonstrate clear benefits in view of conventional tutoring systems. The present methods and systems can conduct coherent dialogs that permit sub-dialogs for asking new questions rather than simply giving hints. The tutorial methods and systems recognize pieces of a correct answer and give positive feedback on those pieces while also planning for tutoring the incorrect pieces. The present methods and systems support multiple and different multi-step tutorial strategies and provide feedback that can be specific to a type of error or that can use a more general strategy or strategies (e.g., KCD's). Furthermore, the present tutorial methods and systems provide the opportunity for follow-up questions in view of evidence of unacceptable comprehension by the student.

Whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention as described in the appended claims. Whereas particular terms of relative orientation such as the "top" and "bottom" of an agenda, for example, have been mentioned herein, it can be appreciated that such terms are merely for convenience of disclosure and are not intended to limit the scope of the present invention.

What is claimed is:

1. A system for tutoring a student in solving a problem described in the form of a dialog with a student including at least one question posed to said student, said system structured for use with a dialog model for generating at least one plan and said at least one question and also structured for use with a student model for receiving and diagnosing input of said student, said system comprising:

means for receiving said diagnosis;

means for generating an agenda including at least one question;

means for applying at least one tutorial strategy to said diagnosis; and, means for providing feedback to said student based on said application of said tutorial strategy and said agenda to said diagnosis.

2. The system of claim 1, further comprising means for applying at least one knowledge remediation dialog specific to at least one error in said student input.

3. The system of claim 2, further comprising means for adding said at least one knowledge remediation dialog to said agenda.

4. The system of claim 1, further comprising means for applying a knowledge construction dialog.

5. The system of claim 4, further comprising means for determining whether a question posed to said student can be decomposed using said knowledge construction dialog.

6. The system of claim 4, wherein said knowledge construction dialog includes a concrete articulation tutorial strategy.

7. The system of claim 4, wherein said knowledge construction dialog includes an explain verbal tutorial strategy.

8. The system of claim 4, wherein said knowledge construction dialog includes a worked example tutorial strategy.

9. The system of claim 4, wherein said knowledge construction dialog includes a decomposition and substitution tutorial strategy.

10. The system of claim 1, further comprising means for applying buggy feedback to said student input.

11. The system of claim 10, further comprising means for applying said buggy feedback to said student input based on at least one error identified in said student input.

12. The system of claim 11, wherein said means for applying said buggy feedback includes means for altering the format of a question to be posed to said student without changing the substance of said question.

13. The system of claim 1, further comprising means for identifying at least an incorrect portion of said student input.

14. The system of claim 13, further comprising means for applying at least one knowledge construction dialog and at least one knowledge remediation dialog for addressing said incorrect portion of said student input.

15. The system of claim 1, further comprising means for identifying at least a correct portion of said student input.

16. The system of claim 15, further comprising means for providing positive feedback to said student based on said correct portion of said student input.

17. The system of claim 1, further comprising means for storing a tutorial plan in said agenda, wherein said tutorial plan includes at least one question related to said problem.

18. The system of claim 1, further comprising means for removing at least one question from said agenda in response to said student input.

19. The system of claim 1, further comprising means for removing at least one question from said agenda if said student demonstrates an understanding of more than one question included in said agenda.

20. The system of claim 1, further comprising means for pre-identifying at least one error type as a common error.

21. The system of claim 1, further comprising means for providing a hint in response to said student input.

22. The system of claim 21, further comprising means for providing a reflective question instead of means for providing said hint.

23. The system of claim 1, further comprising means for determining whether said student input is uninterpretable.

24. The system of claim 1, further comprising means for executing a model-tracing algorithm in said student model while applying no buggy production rules.

25. The system of claim 24, further comprising means for executing said model-tracing algorithm again and means for applying one buggy production rule to said student input.

26. The system of claim 25, further comprising means for executing said model-tracing algorithm again and means for applying at least one additional buggy production rule to said student input.

27. A system for tutoring a student in solving a problem described in the form of a dialog with a student including at least one question posed to said student, said system structure for use with a dialog model for generating at least one plan and said at least one question and also structured for use with a student model for receiving and diagnosing input of said student, said system comprising:

a tutor-processing module for receiving said diagnosis of said student input;

an agenda including at least one question related to said problem;

a module for applying at least one tutorial strategy to said diagnosis; and, wherein said tutor-processing model is structure to provide feedback to said student based on application of said tutorial strategy and said agenda to said diagnosis.

28. The system of claim 27, further comprising said agenda having at least one knowledge remediation dialog specific to at least one error in said student input.

29. The system of claim 27, further comprising said agenda having at least one knowledge remediation dialog.

30. The system of claim 27, further comprising said agenda having at least one knowledge construction dialog.

31. The system of claim 30, wherein said knowledge construction dialog includes a concrete articulation tutorial strategy.

32. The system of claim 30, wherein said knowledge construction dialog includes an explain verbal tutorial strategy.

33. The system of claim 30, wherein said knowledge construction dialog includes a worked example tutorial strategy.

34. The system of claim 30, wherein said knowledge construction dialog includes a decomposition and substitution tutorial strategy.

35. The system of claim 27, wherein said student input includes at least an incorrect portion.

36. The system of claim 27, wherein said student input includes at least a correct portion.

37. The system of claim 27, wherein said agenda includes a tutorial plan having at least one question related to said problem.

38. A computer-readable medium containing instructions for tutoring a student in solving a problem described in the form of a dialog with a student including at least one question posed to said student, said medium adapted for use with a dialog model for generating at least one plan and said at least one question and also adapted for use with a student model for receiving and diagnosing input of said student, said medium comprising:

instructions for receiving said diagnosis in a tutor-processing module;

instructions for generating an agenda including at least one question;

instructions for applying at least one tutorial strategy to said diagnosis; and, instructions for providing feedback to said student based on said application of said tutorial strategy and said agenda to said diagnosis.

39. The medium of claim 38, further comprising instructions for applying at least one knowledge remediation dialog specific to at least one error in said student input.

40. The medium of claim 39, further comprising instructions for adding said at least one knowledge remediation dialog to said agenda.

41. The medium of claim 38, further comprising instructions for applying a knowledge construction dialog.

42. The medium of claim 41, further comprising instructions contained in said tutorial processing module for determining whether a question posed to said student can be decomposed using said knowledge construction dialog.

43. The medium of claim 41, wherein said knowledge construction dialog includes a concrete articulation tutorial strategy.

44. The medium of claim 41, wherein said knowledge construction dialog includes an explain verbal tutorial strategy.

45. The medium of claim 41, wherein said knowledge construction dialog includes a worked example tutorial strategy.

46. The medium of claim 41, wherein said knowledge construction dialog includes a decomposition and substitution tutorial strategy.

47. The medium of claim 38, further comprising instructions for applying buggy feedback to said student input.

48. The medium of claim 47, further comprising instructions for applying said buggy feedback to said student input based on at least one error identified in said student input.

49. The medium of claim 48 wherein said instructions for applying said buggy feedback include instructions for altering the format of a question to be posed to said student without changing the substance of said question.

50. The medium of claim 38, further comprising instructions for identifying at least an incorrect portion of said student input.

51. The medium of claim 50, further comprising instructions for applying at least one knowledge construction dialog and at least one knowledge remediation dialog to address said incorrect portion of said student input.

52. The medium of claim 38, further comprising instructions for identifying at least a correct portion of said student input.

53. The medium of claim 52, further comprising instructions for providing positive feedback to said student based on said correct portion of said student input.

54. The medium of claim 38, further comprising instructions for storing a tutorial plan in said agenda, wherein said tutorial plan includes at least one question related to said problem.

55. The medium of claim 38, further comprising instructions for removing at least one question from said agenda in response to said student input.

56. The medium of claim 38, further comprising instructions for removing at least one question from said agenda if said student demonstrates an understanding of more than one question included in said agenda.

57. The medium of claim 38, further comprising instructions for pre-identifying at least one error type as a common error.

58. The medium of claim 38, further comprising instructions for providing a hint in response to said student input.

59. The medium of claim 58, further comprising instructions for providing a reflective question instead of providing said hint.

60. The medium of claim 38, further comprising instructions for determining whether said student input is uninterpretable.

61. The medium of claim 38, further comprising instructions for executing a model-tracing algorithm in said student model while applying no buggy production rules.

62. The medium of claim 61, further comprising instructions for executing said model-tracing algorithm again and instructions for applying one buggy production rule to said student input.

63. The medium of claim 62, further comprising instructions for executing said model-tracing algorithm again and instructions for applying at least one additional buggy production rule to said student input.

64. A computer-assisted method for tutoring a student in solving a problem described in the form of a dialog with a student including at least one question posed to said student, said method adapted for use with a dialog model for generating at least one plan and said at least one question and also adapted for use with a student model for receiving and diagnosing input of said student, said method comprising:

receiving said diagnosis in a tutor-processing module;

generating an agenda including at least one question;

applying at least one tutorial strategy to said diagnosis; and, providing feedback to said student based on said application of said tutorial strategy and said agenda to said diagnosis to generate a dialog with said student.

65. The method of claim 64, further comprising applying at least one knowledge remediation dialog specific to at least one error in said student input.

66. The method of claim 65, further comprising adding said at least one knowledge remediation dialog to said agenda.

67. The method of claim 64, further comprising applying a knowledge construction dialog in connection with providing said feedback.

68. The method of claim 67, further comprising said tutor-processing module determining whether a question posed to said student can be decomposed using said knowledge construction dialog.

69. The method of claim 67, wherein said knowledge construction dialog includes a concrete articulation tutorial strategy.

70. The method of claim 67, wherein said knowledge construction dialog includes an explain verbal tutorial strategy.

71. The method of claim 67, wherein said knowledge construction dialog includes a worked example tutorial strategy.

72. The method of claim 67, wherein said knowledge construction dialog includes a decomposition and substitution tutorial strategy.

73. The method of claim 64, further comprising applying buggy feedback to said student input.

74. The method of claim 73, further comprising applying said buggy feedback to said student input based on at least one error identified in said student input.

75. The method of claim 74, wherein said applying said buggy feedback includes altering the format of a question to be posed to said student without changing the substance of said question.

76. The method of claim 64, further comprising identifying at least an incorrect portion of said student input.

77. The method of claim 76, further comprising using at least one knowledge construction dialog and at least one knowledge remediation dialog for addressing said incorrect portion of said student input.

78. The method of claim 64, further comprising identifying at least a correct portion of said student input.

79. The method of claim 78, further comprising providing positive feedback to said student based on said correct portion of said student input.

80. The method of claim 64, further comprising storing a tutorial plan in said agenda, wherein said tutorial plan includes at least one question related to said problem.

81. The method of claim 64, further comprising removing at least one question from said agenda in response to said student input.

82. The method of claim 64, further comprising removing at least one question from said agenda if said student demonstrates an understanding of more than one question included in said agenda.

83. The method of claim 64, further comprising pre-identifying at least one error type as a common error.

84. The method of claim 64, further comprising providing a hint in response to said student input.

85. The method of claim 84, further comprising providing a reflective question instead of providing said hint.

86. The method of claim 64, further comprising determining whether said student input is uninterpretable.

87. The method of claim 64, further comprising executing a model-tracing algorithm in said student model while applying no buggy production rules.

88. The method of claim 87, further comprising executing said model-tracing algorithm again and applying one buggy production rule to said student input.

89. The method of claim 88, further comprising executing said model-tracing algorithm again and applying at least one additional buggy production rule to said student input.

* * * * *